United States Patent
Aunstrup et al.

[15] 3,669,843
[45] June 13, 1972

[54] PROCESS FOR THE PRODUCTION OF URICASE

[72] Inventors: Knud Aunstrup; Jorn Leo Mahler, both of Farum, Denmark

[73] Assignee: Novo Terapeutisk Laboratorium A/S, Copenhagen, Denmark

[22] Filed: Aug. 15, 1969

[21] Appl. No.: 858,907

[30] Foreign Application Priority Data

Aug. 19, 1968 Great Britain......................39,537/68

[52] U.S. Cl. .........................................................195/66 R
[51] Int. Cl. ....................................C07g 7/028, C12d 13/10
[58] Field of Search.....................................................195/66

[56] References Cited

UNITED STATES PATENTS 3,431,176  3/1969  Fukumoto et al........................195/66

OTHER PUBLICATIONS

Chemical Abstracts Vol. 68, 1968

*Primary Examiner*—Lionel M. Shapiro
*Attorney*—Synnestvedt & Lechner

[57] ABSTRACT

Production of the enzyme uricase by aerobic cultivation of a strain of Bacillus fastidiosus or a variant thereof.

5 Claims, No Drawings

PROCESS FOR THE PRODUCTION OF URICASE

This invention relates to a process for the production of uricase, an enzyme which specifically catalyzes the oxidation of uric acid. The invention also relates to uricase as prepared by means of the present process.

Uricase may be used in the treatment of gout, and it may be used for the determination of uric acid in blood and urine.

Uricase is usually isolated from internal animal organs, like kidney and liver, by extraction and fractionation. The isolation methods are complicated, however, and the raw materials expensive so that the price of the uricase produced by this method will be high. In the last few years, interest was therefore focussed on uricase from microbial sources. Methods of production of uricase have been described by several authors, e.g. in British Pat. No. 1,104,197 and in French Pat. No. 1,529,675.

A common feature of these methods is that the enzyme occurs intracellularly in the microorganism, so that a mechanical or chemical destruction of the cells is necessary in order to release the enzyme. Furthermore, the enzyme produced will be particle bound in many cases, which is a serious disadvantage where enzymes of high purity are required, such as for therapeutic applications.

It has now been found that when cultivated under aerobic conditions on a medium containing uric acid or an equivalent thereof and other suitable nutrients, the microorganism *Bacillus fastidiosus*, or a new Bacillus, which is a variant of *Bacillus fastidiosus*, will produce uricase in high yields, and accumulate it in the culture fluid thus allowing a simple purification procedure.

Thus, in accordance with the invention the present process may be defined as a process for the production of uricase, wherein *Bacillus fastidiosus* or a variant thereof is cultivated under aerobic conditions on a medium comprising uric acid or an equivalent thereof, whereafter, if desired, the uricase produced is isolated from the culture medium.

As appears from the following, specific examples of Bacillus strains useful in the present process are *Bacillus fastidiosus* NCIB 10423, *Bacillus fastidiosus* NCIB 10424, *Bacillus fastidiosus var*. NCIB 10425 and *Bacillus fastidiosus var*. NCIB 10372.

An important advantage of the bacterial uricase prepared in accordance with the process of the invention as opposed to usual commercial preparations of the well-known mammalian uricase is the combination of high activity and complete solubility with low absorption in the ultraviolet range of the spectrum. The complete solubility ensures the stability of enzyme absorption (however low) which is a prerequisite of the precise determination of uric acid by differential ultra-violet spectroscopy.

*B. fastidiosus* has been described by L.E. den Dooren de Jong, Zentralbl. Bakt. Par., 2. Abt. 79, 344 (1929). The characteristics of the microorganism as given by den Dooren de Jong are listed in the following:

Morphology:
Motile spore forming rod, 4–5 × 1.5–2.5$\mu$, spore oval, terminal
Colony form:
The colonies are surrounded by characteristic rhizoid outgrowths.
Nutrient requirements:
Uric acid is required for growth and may be used as the only carbon and nitrogen source.
No anaerobic growth.

The characteristics of the above mentioned new variant of *B. fastidiosus* are described in the following:
Morphology:
Non-motile spore forming rod
Sporangium not swollen
Spores oval, central to subterminal, 0.6$\mu$ × 0.8$\mu$
Vegetative cells on bouillon agar + 1 percent uric acid, 0.6 – 0.8$\mu$ × 3–4$\mu$
Vegetative cells on bouillon agar, 0.6–0.8$\mu$ × 1–2$\mu$
Nutrient requirements:
Uric acid may be used as the only carbon and nitrogen source.
Growth on bouillon agar:
Slow. Colonies are white and whole-edged.
Diameter after 3–4 days at 37° C: 1–2 mm.
The growth may be the result of impurities of uric acid in the medium.
Growth on bouillon agar + 1 percent uric acid:
Good after 24 hours at 37° C. Characteristic fried egg-formed, whole-edged colonies with a diameter of 3–5 mm. The growth is better than on pure uric acid.
Anaerobic growth:
None.

Two strains of this new variant of *B. fastidiosus* have been isolated, viz. NCIB 10425 and NCIB 10372.

*B. fastidiosus var*. NCIB 10372 (C 327) was isolated from a soil sample (taken on Zealand, Denmark) in the following manner:

In 500 ml Erlenmeyer flasks 100 ml of a medium of the following composition were placed in each flask:

| | |
|---|---|
| Uric acid | 1 gram |
| Na$_2$HPO$_4$·12H$_2$O | 2 grams |
| Tap water | 100 ml |

To each flask 1 gram of the soil sample was added and boiled for 10 minutes in order to remove vegetative cells. The flask contents were then incubated at 30° C on a shaking table (220 rpm) for 4 days, whereupon the flask contents were transferred to another set of flasks each containing the above medium. These flasks were incubated for 2 days, and the flask contents were then plated on uric acid agar having the above composition and additionally containing 2 per cent of agar. The agar plates thus treated were incubated at 30° C and investigated for clear zones indicating dissolution of the uric acid precipitate.

Colonies giving clear zones were transferred to fresh uric acid agar plates until pure cultures were obtained. These cultures were then freeze-dried.

*B. fastidiosus var*. NCIB 10425 has been isolated from a soil sample from a chicken pen using a method similar to that described above, except that the enrichment medium contained 1 percent uric acid and 0.1 percent K$_2$HPO$_4$ in tap water and that the Erlenmeyer flasks were incubated for five days at 37° C without shaking. The bacteria were isolated from these flasks by plating on agar plates with the composition given above supplemented with 2 percent agar.

The uricase enzyme prepared in accordance with the process of the invention is soluble and stable in solution. The enzyme activity is maximum at about pH 9.0. After purification as described in the following the natural absorption of the enzyme at 293 m$\mu$ is sufficiently low as required for use of the enzyme in uric acid determination.

The uricase unit referred to in the following is defined as follows:

30.00 mg of uric acid is dissolved in 0.1 M borate buffer (pH 9.0). pH is adjusted with 1.0 M LiOH, and 0.1 M borate buffer (pH 9.0) is added to a final volume of 150 ml.

4.00 ml of this medium is placed in a 100 ml graduated flask which rotates on a hollow shaft at 37° C thus securing an effective aeration. 1.00 ml of the enzyme solution (pH 9.0) to be tested is added, and after 10 minutes the flask is filled up with 0.1 M HCl, thus stopping the reaction. The optical density (OD) is measured in a quartz cuvette against air at 283 m$\mu$. The blind value is provided by adding HCl prior to the enzyme solution (preventing a reaction) and measuring as above. The difference between the two thus measured values is $\Delta OD_{283}$.

One uricase unit is defined as corresponding to 1$\mu$ mole of uric acid decomposed per minute at pH 9.0 and 37° C. Since uric acid in 0.1 M HCl has maximum optical density at 283 m$\mu$, at which the molar extinction is 1.238 × 10$^4$, the number of uricase units per ml of enzyme solution is equal to:

Units per ml = $\Delta OD_{283}/1.238$

The process of this invention if further illustrated in the following examples.

Example 1

B. fastidiosus NCIB 10423 was cultured on 500 ml shaking flasks containing 100 ml of medium with the following composition:

| | | |
|---|---|---|
| Uric acid | 10 | g/l |
| Saccharose | 5 | g/l |
| Yeast extract | 1 | g/l |
| KH$_2$PO$_4$ | 1 | g/l |
| MgSO$_4$ | 0.5 | g/l |
| Trypsin digested casein | 5 | g/l |
| Polyglycol | 0.1 | g/l |

The cultivation was carried out at 30° C for 5 days on a rotary shaking table (220 r.p.m.). The uricase yield obtained was 0.24 units per ml. The pH was 8.9.

Example 2

B. fastidiosus NCIB 10424 was cultured as described in Example 1, the yield obtained was 0.27 units per ml. The pH was 9.0.

Example 3

B. fastidiosus var. NCIB 10425 was cultures as described in Example 1, the yield obtained was 0.18 units per ml. The pH was 9.0.

Example 4

In a 10 l fermentor 6 liters of a medium of the composition given in Example 1 were prepared.

The medium was sterilized for 60 minutes at 120° C, cooled to 35° C and inoculated with 100 ml of a 24 hours old shake flask culture of B. fastidiosus var. NCIB 10372 with the composition of medium described in the foregoing. Stirring and aeration were started and the fermentation was continued at 34° C. After 96 hours a uricase activity of 0.27 units per ml was obtained. The fermentation was stopped, and the culture liquid was worked up as follows:

After centrifuging from the cells 160 ml of the culture liquid were placed at −10° C. 300 ml acetone (−10° C) were added with stirring. After 1 hour the precipitate was centrifuged off (0° C, 400 rpm, 10 minutes) and was redissolved in 160 ml 0.1 M borate buffer of pH 9.0. The resulting solution contained 0.23 units per ml. After dialysis against two portions of borate buffer (pH 9.0) at 3°–5° C a stable liquid product was obtained. The OD$_{293}$ of this product met the requirements for uric acid determination, the OD$_{293}$ being equal to 0.40 per unit per ml. This corresponds to a natural enzyme absorption of OD$_{293}$ = 0.009 under conditions typically employed in uric acid determination (3 ml volume, 16 minutes reaction time at room temperature, ph 9.0).

The nutrient media and the purification methods described in the above examples may be varied considerably within the scope of the invention, e.g. by substituting other constituents for the specific constituents of the above media. The expression "a medium comprising uric acid or an equivalent thereof" as employed in the foregoing and in the appended claims is intended to encompass uric acid per se as well as other compounds which also allow the production of uricase when used in the instant process.

Example 5

Under conditions as described in Example 4 a uricase activity of 0.70 units per ml was obtained after fermentation in a 100 l fermentor for 112 hours. The fermentation was then stopped.

45 l culture liquid were centrifuged giving 44 l of clear supernatant and 370 g sludge. The supernatant was cooled to 0° C and 85 l of acetone (cooled to −10° C) were added under stirring, after which the mixture was cooled to −10° C. After 1 hour's stirring it was centrifuged and the precipitate (75 g wet weight) was dissolved at 0° C in 10 l of 0.1 M tris-hydrochloric acid buffer pH (25° C) = 8.0 (tris=tris(hydroxymethyl)-aminomethane). The solution was dialyzed against twice 250 l of the same buffer for 16 + 24 hours at 4° C. The dialysate was centrifuged until it was clear. The uricase content was then 2.50 units per ml.

To 400 ml of centrifuged dialysate were added 149 mg of EDTA-disodium salt (EDTA = ethylenediamine tetraacetic acid). The dialysate was adsorbed on a column containing about 7 g of DEAE A–50 Sephadex ion-exchanger equilibrated with 0.1 M tris-hydrochloric acid buffer pH = 8.0. Elution was made with an increasing gradient of 1,540 ml of the same buffer + 1540 ml of the same buffer containing 1 mole sodium chloride per l. The active fractions were pooled and contained a total of 780 units of uricase. The specific activity was 4.56 units per ml and OD$_{293}$ = 0.090/unit/ml. The uricase solution was diluted with 0.1 M tris hydrochloric acid buffer pH = 8.0 to standardize to 4.0 units per ml and EDTA-disodium salt was added to make a concentration of 10$^{-3}$ moles of EDTA per liter. Then the product was lyophilized in vials containing 5 ml each. When reconstituting with 2 ml of distilled water one vial contains enough uricase for 100 determinations of uric acid. The enzyme has OD$_{293}$ = 0.006 under the conditions used in a quick determination of uric acid, i.e. volume 3 ml, reaction time 8 minutes at room temperature, pH = 9.0–9.5. The lyophilized enzyme product is stable at 4° C as well as at room temperature (25° C).

What we claim is:

1. A process for the production of uricase, wherein *Bacillus fastidiosus* or a variant thereof is cultivated under aerobic conditions on a medium comprising uric acid and thereafter isolating the uricase from the culture medium.

2. A process as claimed in claim 1, wherein *Bacillus fastidiosus* NCIB 10423 is used.

3. A process as claimed in claim 1, wherein *Bacillus fastidiosus* NCIB 10424 is used.

4. A process as claimed in claim 1, wherein *Bacillus fastidiosus var.* NCIB 10425 is used.

5. A process as claimed in claim 1, wherein *Bacillus fastidiosus var.* NCIB 10372 is used.

* * * * *